(12) United States Patent
Takura et al.

(10) Patent No.: US 12,741,211 B2
(45) Date of Patent: Sep. 22, 2026

(54) INFORMATION PROCESSING APPARATUS AND INFORMATION PROCESSING SYSTEM

(71) Applicant: SONY GROUP CORPORATION, Tokyo (JP)

(72) Inventors: Kento Takura, Tokyo (JP); Tasuku Inui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 656 days.

(21) Appl. No.: 17/906,990

(22) PCT Filed: Mar. 30, 2020

(86) PCT No.: PCT/JP2020/014505
§ 371 (c)(1),
(2) Date: Sep. 22, 2022

(87) PCT Pub. No.: WO2021/199134
PCT Pub. Date: Oct. 7, 2021

(65) Prior Publication Data
US 2023/0118364 A1 Apr. 20, 2023

(51) Int. Cl.
*A63F 13/5252* (2014.01)
*A63F 13/35* (2014.01)
*H04L 67/12* (2022.01)

(52) U.S. Cl.
CPC .......... *A63F 13/5252* (2014.09); *A63F 13/35* (2014.09); *H04L 67/12* (2013.01)

(58) Field of Classification Search
CPC ....... A63F 13/5252; A63F 13/35; H04L 67/12
See application file for complete search history.

(56) References Cited

U.S. PATENT DOCUMENTS 8,964,830 B2 * 2/2015 Perlman ............. H04N 21/6587 345/161
9,314,691 B2 * 4/2016 Perlman ................ H04L 65/765
(Continued)

FOREIGN PATENT DOCUMENTS

CN 104010179 A 8/2014
JP 2009-267525 A 11/2009
(Continued)

OTHER PUBLICATIONS

International Search Report and Written Opinion of PCT Application No. PCT/JP2020/014505, issued on Jun. 2, 2020, 12 pages of ISRWO.

(Continued)

*Primary Examiner* — Ankit B Doshi
(74) *Attorney, Agent, or Firm* — CHIP LAW GROUP

(57) ABSTRACT

[Object] To provide an information processing apparatus and an information processing system that make it possible to play a game smoothly while using a mobile communication system.
[Solving Means] An information processing apparatus according to the present technology includes a control section and a communication section. The control section performs rendering to generate a first video obtained when a virtual space to which a plurality of users is capable of getting connected is viewed from a first point of view; assigns, to the first video, an identifier indicating that a first slice that is given a high communication priority is used for communication; performs rendering to generate a second video obtained when the virtual space is viewed from a second point of view that is different from the first point of view; and assigns, to the second video, an identifier indicating that a second slice that is given a lower communication priority than the first slice is used for communication.

(Continued)

The communication section transmits the first video and the second video through a communication network.

8 Claims, 2 Drawing Sheets

(56) References Cited

U.S. PATENT DOCUMENTS

| | | | | |
|---|---|---|---|---|
| 9,814,987 | B1 * | 11/2017 | Lawson | A63F 13/355 |
| 10,065,122 | B1 * | 9/2018 | Lawson | A63F 13/352 |
| 10,376,795 | B2 * | 8/2019 | Garg | A63F 13/87 |
| 11,358,057 | B2 * | 6/2022 | Smithers | A63F 13/86 |
| 2002/0142843 | A1 * | 10/2002 | Roelofs | A63F 13/31 463/42 |
| 2006/0058103 | A1 * | 3/2006 | Danieli | A63F 13/87 463/42 |
| 2016/0107087 | A1 * | 4/2016 | Miura | A63F 13/87 463/29 |
| 2016/0127508 | A1 | 5/2016 | Perrin | |
| 2017/0003784 | A1 * | 1/2017 | Garg | A63F 13/87 |
| 2017/0368454 | A1 * | 12/2017 | Sivak | A63F 13/35 |
| 2018/0176468 | A1 * | 6/2018 | Wang | G09G 5/14 |
| 2018/0221774 | A1 * | 8/2018 | Sullivan | A63F 13/352 |
| 2019/0262723 | A1 * | 8/2019 | Trombetta | A63F 13/79 |
| 2019/0366210 | A1 | 12/2019 | Beltran | |

FOREIGN PATENT DOCUMENTS

| | | | |
|---|---|---|---|
| JP | 2010-539765 | A | 12/2010 |
| JP | 2015-077291 | A | 4/2015 |
| WO | 2016/152587 | A1 | 9/2016 |
| WO | WO-2019168630 | A2 | 9/2019 |

OTHER PUBLICATIONS

Honma, et al., “How will the game change with 5G?”, The 5G forefront that you want to keep in mind, Updated Version, May 18, 2020, 89 pages.

Koyama, et al., “I-054 Real Time Transmission of 3D Video via Network”, 3rd Forum on Information Technology (FIT2004), Institute of Electronics, Information and Communication Engineers and Information Processing Society of Japan, Aug. 20, 2004, pp. 125-126.

* cited by examiner

INFORMATION PROCESSING APPARATUS AND INFORMATION PROCESSING SYSTEM

CROSS REFERENCE TO RELATED APPLICATIONS

This application is a U.S. National Phase of International Patent Application No. PCT/JP2020/014505 filed on Mar. 30, 2020. Each of the above-referenced applications is hereby incorporated herein by reference in its entirety.

TECHNICAL FIELD

The present technology relates to an information processing apparatus and an information processing system that are related to slicing.

BACKGROUND ART

In recent years, a game that is played by a mobile apparatus being connected to a network using a mobile communication system has become widespread. For example, Patent Literature 1 discloses a method for updating, using a mobile apparatus, a multiplayer gaming session executed by the mobile apparatus being connected to a communication system.

CITATION LIST

Patent Literature

Patent Literature 1: Japanese Unexamined Patent Application Publication No. 2010-539765

DISCLOSURE OF INVENTION

Technical Problem

However, the connection with a network as disclosed in Patent Literature 1 has been performed using a best-effort communication. The best-effort communication may cause, for example, data loss or data delay depending on a communication condition, and this may result in being unable to play a game smoothly.

In view of the circumstances described above, it is an object of the present technology to provide an information processing apparatus and an information processing system that make it possible to play a game smoothly while using a mobile communication system.

Solution to Problem

In order to achieve the object described above, an information processing apparatus according to an embodiment of the present technology includes a control section and a communication section.

The control section performs rendering to generate a first video obtained when a virtual space to which a plurality of users is capable of getting connected is viewed from a first point of view; assigns, to the first video, an identifier indicating that a first slice that is given a high communication priority is used for communication; performs rendering to generate a second video obtained when the virtual space is viewed from a second point of view that is different from the first point of view; and assigns, to the second video, an identifier indicating that a second slice that is given a lower communication priority than the first slice is used for communication.

The communication section transmits the first video and the second video through a communication network.

The virtual space may be a virtual space generated by a game,

- the first point of view may be a point of view of a player of the game, and
- the second point of view may be a point of view of a viewer of the game.

The second point of view may be a point of view of a switcher who generates a watching-use video of the game.

The second point of view may be a specific point of view selected by the number of audiences from a plurality of closely situated points of view classified into clusters, each of the plurality of closely situated points of view being a point of view of an audience who is capable of viewing the virtual space from an arbitrary point of view.

The control section may further perform rendering to generate a third video obtained when the virtual space is viewed from a third point of view that is different from the first point of view and the second point of view, and assign, to the third video, an identifier indicating that a third slice that is given a lower communication priority than the second slice is used for communication, and

- the communication section may further transmit the third video through the communication network.

The virtual space may be a virtual space generated by a game,

- the first point of view may be a point of view of a player of the game,
- the second point of view may be a point of view of a switcher who generates an audience-use video of the game, and
- the third point of view may be a specific point of view selected by the number of audiences from a plurality of closely situated points of view classified into clusters, each of the plurality of closely situated points of view being a point of view of an audience who is capable of viewing the virtual space from an arbitrary point of view.

The virtual space may be a virtual space generated by combining videos of a sports competition that are captured using a plurality of cameras,

- the first point of view may be a point of view of a switcher who generates an audience-use video of the game, and
- the second point of view may be a specific point of view selected by the number of audiences from a plurality of closely situated points of view classified into clusters, each of the plurality of closely situated points of view being a point of view of an audience who is capable of viewing the virtual space from an arbitrary point of view.

In order to achieve the object described above, an information processing apparatus according to an embodiment of the present technology includes a first terminal, a second terminal, and a server apparatus.

The first terminal includes a first control section and a first communication section.

The second terminal includes a second control section and a second communication section.

The server apparatus includes a third control section that performs rendering to generate a first video obtained when a virtual space to which a plurality of users is capable of getting connected is viewed from a first point of view, assigns, to the first video, an identifier indicating that a first slice that is given a high communication priority is used for communication, performs rendering to generate a second video obtained when the virtual space is viewed from a second point of view that is different from the first point of view, and assigns, to the second video, an identifier indicating that a second slice that is given a lower communication priority than the first slice is used for communication; and a third communication section that is connected to the first communication section and the second communication section through a communication network, the third communication section transmitting the first video to the first communication section and transmitting the second video to the second communication section.

MODE(S) FOR CARRYING OUT THE INVENTION

[Overall Configuration of Information Processing System]

Figure 1:
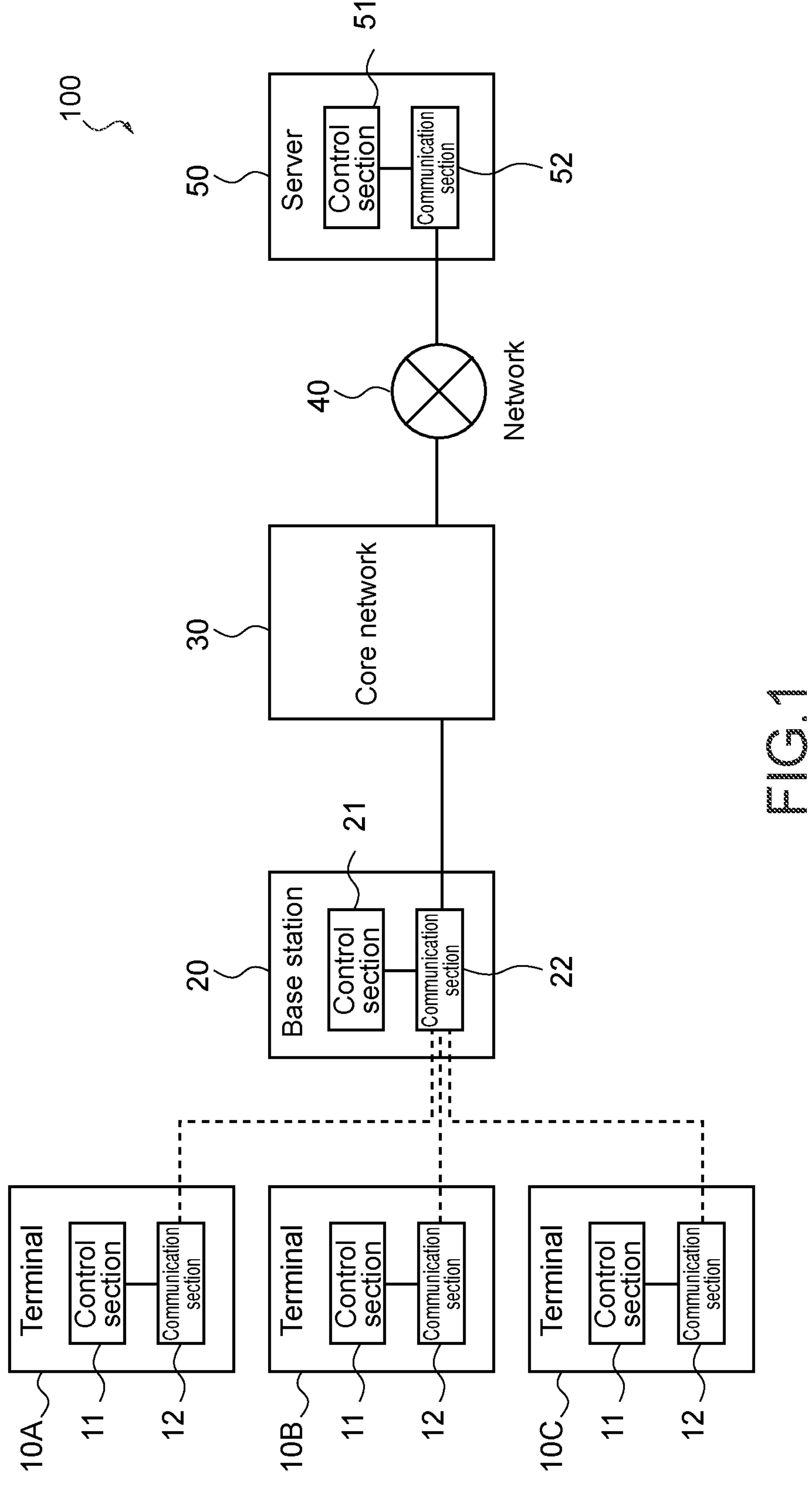
FIG. 1 schematically illustrates an information processing system according to an embodiment of the present technology.

FIG. 1 is a block diagram illustrating an overall configuration of an information processing system 100 according to an embodiment of the present technology. As illustrated in the figure, the information processing system 100 includes a terminal 10, a base station 20, a core network 30, a network 40, and a server apparatus 50.

The terminal 10 is a terminal that can communicate with the base station 20 using the 5th generation mobile communication system (5G), and can be a PC or a smartphone. In FIG. 1, three terminals 10 that are connected to the base station 20 are respectively referred to as a terminal 10A, a terminal 10B, and a terminal 10C. The terminal 10 is not limited to a PC and a smartphone, and it is sufficient if the terminal 10 is a 5G-compliant terminal. The terminal 10 includes a control section 11 and a communication section 12, and the communication section 12 communicates with a communication section 22 under the control of the control section 11.

The base station 20 forms a radio access network (RAN), and provides wireless communication services to at least one terminal 10. The base station 20 can wirelessly communicate with the terminal 10 in accordance with a wireless communication scheme based on New Radio (NR), which is a standard that succeeds Long Term Evolution (LTE). The base station 20 includes a control section 21 and the communication section 22, and the communication section 22 communicates with the communication section 12 under the control of the control section 21. Further, the communication section 22 is connected to the network 40 through the core network 30.

The core network 30 is a network that connects an exchanger connected to a control apparatus of the base station 20, and another exchanger, and includes, for example, the Mobility Management Entity (MME), the Serving Gateway (S-GW), and the Packet Data Network Gateway (P-GW).

The network 40 is a computer network that connects a plurality of information processing apparatuses, and is, for example, the Internet. Further, the network 40 may be formed in the core network 30.

The server apparatus 50 is connected to the terminal 10 through the network 40, the core network 30, and the base station 20, and provides services to the terminal 10. The server apparatus 50 includes a control section 51 and a communication section 52, and the communication section 52 communicates with the communication section 22 through the network 40 and the core network 30 under the control of the control section 51.

[Regarding New Radio (NR)]

The NR has two features. A first feature is providing an enhanced massive communication using a frequency band of from 6 GHz up to 100 GHz, and a second feature is efficiently accommodating a plurality of types of communications for various use cases.

Here, examples of the plurality of types of communications include enhanced Mobile Broadband (eMBB), Ultra-Reliable and Low Latency Communications (URLLC), and massive Machine Type Communication (mMTC). Accommodating the plurality of types of communications in a single network using the NR is discussed.

In the case of LTE, the Evolved Packet Core (EPC) is adopted as a communication technology for the core network 30. New Core is discussed as a successor of the EPC. There is a need to efficiently accommodate the plurality of types of communications described above and to keep down CAPEX/OPEX (capital expenditure, operational expenditure) by adopting New Core.

However, it is difficult to provide physically separate networks for the respective types of communications in order to provide the plurality of types of communications, while keeping down CAPEX/OPEX. Thus, operating a plurality of logical networks corresponding to the plurality of types of communications in a physically single network, and flexibly modifying a capacity of the logical network according to a demand for communication traffic for each type of communication, are discussed.

It is conceivable that, for this purpose, each node (that is, communication equipment) of the core network could be implemented as a virtual machine, and an operation of the node depending on a target type of communication could be virtually performed for each logical network. The reason is that, with respect to a function that is implemented using a virtual machine, the number of functions can be increased or reduced according to an increase or a reduction in a demand for communication, and the number of calculator resources assigned for each function can be increased or decreased.

Using a virtual network technology, the function implemented using a virtual machine is connected to another function to create a network. There is a technology called OpenFlow that is an example of such a virtual network technology, in which a rule for each switch is distributed by a central controller, and the switch is operated according to the rule distributed by the controller. OpenFlow enables a flexible network operation by freely switching a switch that connects functions implemented using virtual machines.

A technology that provides logical networks having different properties by combining a virtual machine and a virtual network technology such as OpenFlow, as described above, is called slicing.

[Regarding Slicing]

Figure 2:
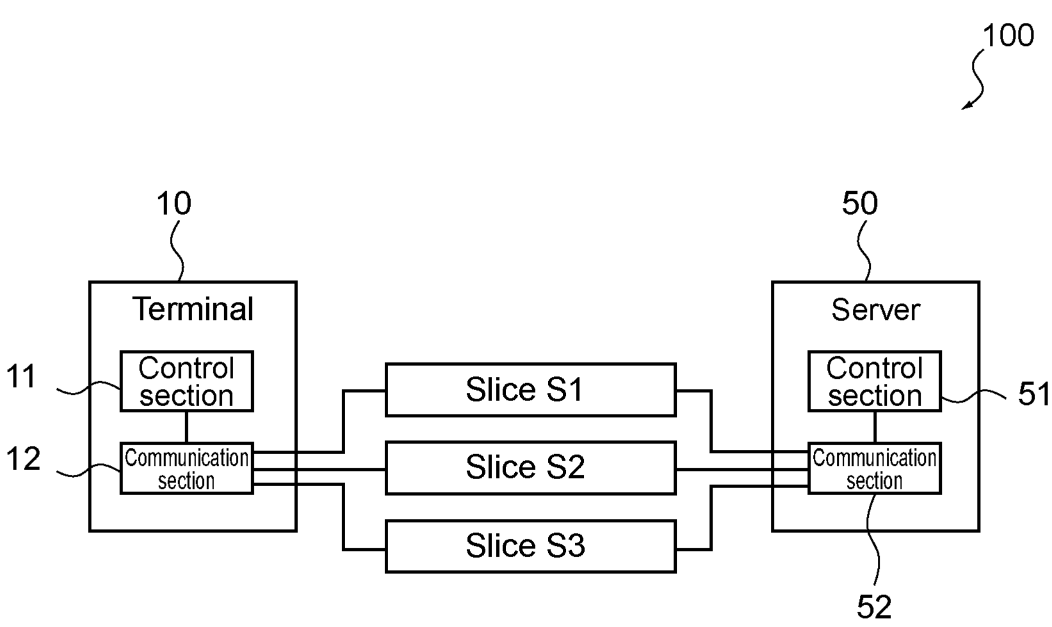
FIG. 2 schematically illustrates a slice formed in the information processing system.

FIG. 2 schematically illustrates slicing in the information processing system 100. As illustrated in the figure, a plurality of slices is formed between the terminal 10 and the server apparatus 50 in a single physical network using slicing. The plurality of slices formed in the information processing system 100 is hereinafter referred to as a "slice S1", a "slice S2", and a "slice S3".

The slice S1 is a slice that is given a highest communication priority, and the slice S2 is a slice that is given a medium communication priority. The slice S3 is a slice that is given a lowest communication priority. The communication priority indicates a degree of priority for communication, and it can be said that a slice with a higher communication priority has a higher communication rate.

Table 1 is a table in which information regarding mapping to a slice in the information processing system 100 is given. As given in Table 1, the slice S1 is a logical network for a high-capacity and low-latency communication, and is, for example, a logical network for eMBB. The slice S2 is a logical network for a low-latency communication, and is, for example, a logical network for URLLC. The slice S3 can be a logical network for a best-effort communication.

TABLE 1

| | |
|---|---|
| Slice S1 | High capacity and low latency |
| Slice S2 | Low latency |
| Slice S3 | Best effort |

Note that mapping to a slice is not limited to what is given in Table 1, and it is sufficient if the slice S1 is given a highest communication priority, the slice S2 is given a medium communication priority, and the slice S3 is given a lowest communication priority.

As described above, logically independent networks that can provide communication services different from each other are provided in a single physical network. Slicing makes it possible to flexibly provide logical networks having different uses. Further, slicing makes it possible to flexibly modify a capacity of each slice by increasing or decreasing the number of calculator resources assigned to a virtual machine and by changing switching.

Note that each slice may be formed between the terminal 10 and the server apparatus 50 through a RAN, the core network 30, and the network 40. Further, each slice may be formed only in the RAN and the core network 30, or may be formed only in the core network 30. Furthermore, the number of slices is not limited to three, and may be two, or four or more.

Further, an identifier called Single-Network Slice Selection Assistance Information (S-NSSAI) is assigned to data communicated between the terminal 10 and the server apparatus 50, and the terminal 10, the RAN, and the core network 30 can determine, using this identifier, which slice is to be used to communicate the data.

[Operation of Information Processing System]

An operation of the information processing system 100 is described. The information processing system 100 is used in a state in which there are a "player" who plays a game of, for example, an e-sports competition, and a "viewer" who does not play the game but views a screen of the game.

The viewers include a "switcher" and an "audience". The switcher can distribute a watching-use video displayed on, for example, a large-screen display that is arranged in an e-sports venue. The audience gets connected to a game that is being played, and can view the game from a point of view desirable for the audience himself/herself.

The control section 51 generates a virtual space on the basis of data of a game. Using the terminal 10A, a player gets connected to the virtual space and plays a game. The point of view of the player in the virtual space 10 can be discretionarily operated by the player, and the point of view of a player in a virtual space is hereinafter referred to as a "player's point of view". On the basis of 3D data of a game, the control section 51 performs rendering to generate a video obtained when a virtual space is viewed from a player's point of view. This video is hereinafter referred to as a "player's video".

Further, using the terminal 10B, a switcher gets connected to the virtual space, and can individually operate a point of view that is different from the point of view of a player. The point of view of a switcher in a virtual space is hereinafter referred to as a "switcher's point of view". On the basis of 3D data of a game, the control section 51 performs rendering to generate a video obtained when a virtual space is viewed from a switcher's point of view. This video is hereinafter referred to as a "switcher's video".

Furthermore, using the terminal 10C, an audience gets connected to the virtual space, and can individually operate a point of view that is different from the points of view of a player and a viewer. The point of view of an audience in a virtual space is hereinafter referred to as an "audience's point of view". On the basis of 3D data of a game, the control section 51 performs rendering to generate a video obtained when a virtual space is viewed from an audience's point of view. This video is hereinafter referred to as an "audience's video".

Note that the control section 51 may classify audience's points of view into clusters when, for example, the number of audience's points of view is a specified number or more. In other words, with respect to audience's points of view that are situated closely to each other in a certain range in a virtual space, the control section 51 may consider, as an in-common audience's point of view in the certain range, an audience's point of view for which the number of audiences is largest in the audience's points of view in the certain range.

The control section 51 maps the videos described above to the respective slices S1 to S3, as given in Table 2 indicated below.

TABLE 2

| | |
|---|---|
| Player's video | Slice S1 |
| Switcher's video | Slice S2 |
| Audience's video | Slice S3 |

As given in Table 2, the control section 51 maps a player's video to the slice S1, maps a switcher's video to the slice S2, and maps an audience's video to the slice S3. The control section 51 assigns, to a player's video, an identifier indicating that the slice S1 is used for communication, assigns, to a switcher's video, an identifier indicating that the slice S2 is used for communication, and assigns, to an audience's video, an identifier indicating that the slice S3 is used for communication. These identifiers can be, for example, the S-NSSAI described above.

The control section 51 supplies the communication section 52 with the videos respectively assigned the identifiers. Through the network 40, the core network 30, and the RAN formed by the base station 20, the communication section 52 transmits the player's video to the terminal 10A, transmits the switcher's video to the terminal 10B, and transmits the audience's video to the terminal 10C. In all of or a portion of these communication networks, each piece of information is transmitted using a slice indicated by an identifier. Accordingly, the player's video is transmitted to the terminal 10A using the slice S1, the switcher's video is transmitted to the terminal 10B using the slice S2, and the audience's video is transmitted to the terminal 10C using the slice S3. Note that mapping of a video to a slice does not necessarily have to be performed by the server apparatus 50, but may be performed by the terminal 10, the base station 20, or the core network 30 using an identifier.

[Effects Provided by Information Processing System]

As described above, in the information processing system 100, a video obtained by performing rendering with a player's point of view, a video obtained by performing rendering with a switcher's point of view, and a video obtained by performing rendering with an audience's point of view are respectively transmitted using the slices S1 to S3.

Since a player's video is transmitted using the slice Si given a highest communication priority, an effect on a game play that is caused due to communication can be minimized. Further, a switcher's video is transmitted using the slice S2 given a second-highest communication priority, and an audience's video is transmitted using the slice S3 given a lowest communication priority. Thus, the switcher's video viewed by a large number of audiences is transmitted in preference to the audience's video viewed by an individual audience. Accordingly, viewing of a switcher's video will be ensured even if there is too large a number of people intending to view audience's videos.

As described above, the information processing system 100 makes it possible to transmit, to the terminal 10, a video of a virtual space generated by a game and viewed from each point of view, using a slice selected according to a type of user, and thus to efficiently use a communication line and improve an experience of a user.

[Modifications]

The example in which three types of points of view that are a player's point of view, a switcher's point of view, and an audience's point of view exist in a virtual space, has been described above. However, with respect to the switcher's point of view and the audience's point of view, only one of them may exist.

When only a player's point of view and a switcher's point of view exist in a virtual space, the control section 51 can map a player's video to the slice S1, and can map a switcher's video to the slice S2. Further, when only a player's point of view and an audience's point of view exist in a virtual space, the control section 51 can map a player's video to the slice S1, and can map an audience's video to the slice S2.

Further, a virtual space generated by a game has been described above. However, a virtual space to which the present technology can be applied may be a virtual space in which a point of view can be freely moved and that is generated by combining videos of a real-world sports competition that are captured using a plurality of cameras. In this case, a switcher's point of view and an audience's point of view can exist in the virtual space, and the control section 51 can map the switcher's video to the slice S1, and can map the audience's video to the slice S2.

[Hardware Configuration]

Figure 3:
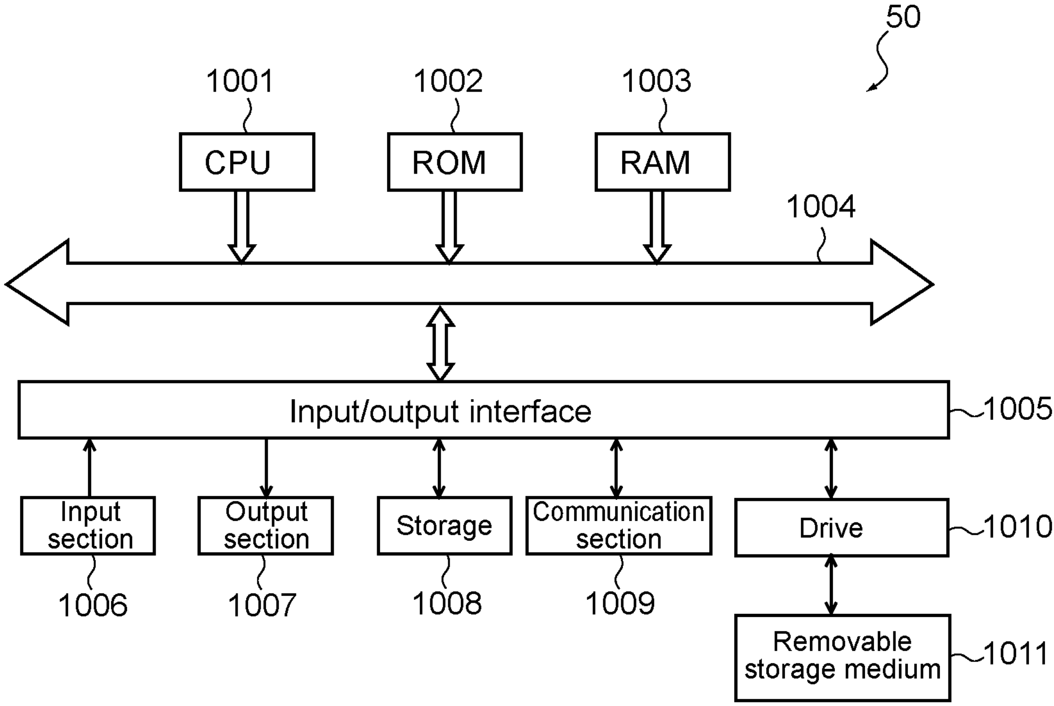
FIG. 3 is a block diagram illustrating a hardware configuration of a server apparatus included in the information processing system.

A hardware configuration of the server apparatus 50 is described. FIG. 3 schematically illustrates a hardware configuration of the server apparatus 50.

As illustrated in the figure, the server apparatus 50 includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input section 1006, an output section 1007, a storage 1008, and a communication section 1009 are connected to the input/output interface 1005. The input section 1006 includes input devices such as a keyboard and a mouse that are used by a user to input an operation command. The output section 1007 outputs a processing operation screen and an image of a processing result to a display device. The storage 1008 includes, for example, a hard disk drive that stores therein a program and various data. The communication section 1009 includes, for example, a local area network (LAN) adapter, and performs communication processing through a network as represented by the Internet. Further, a drive 1010 is connected to the input/output interface 1005. The drive 1010 reads data from and writes data into a removable storage medium 1011 such as a magnetic disk, an optical disk, a magneto-optical disk, or a semiconductor memory.

The CPU 1001 performs various processes in accordance with a program stored in the ROM 1002, or in accordance with a program that is read from the removable storage medium 1011 such as a magnetic disk, an optical disk, a magneto-optical disk, or a semiconductor memory to be installed on the storage 1008, and is loaded into the RAM 1003 from the storage 1008. Data necessary for the CPU 1001 to perform various processes is also stored in the RAM 1003 as necessary.

In the server apparatus 50 having the configuration described above, the series of processes described above is performed by the CPU 1001 loading, for example, a program stored in the storage 1008 into the RAM 1003 and executing the program via the input/output interface 1005 and the bus 1004.

For example, the program executed by the server apparatus 50 can be provided by being recorded in the removable storage medium 1011 serving as, for example, a package medium. Further, the program can be provided via a wired or wireless transmission medium such as a local area network, the Internet, or digital satellite broadcasting.

In the server apparatus 50, the program can be installed on the storage 1008 via the input/output interface 1005 by the removable storage medium 1011 being mounted on the drive 1010. Further, the program can be received by the communication section 1009 via the wired or wireless transmission medium to be installed on the storage 1008. Moreover, the program can be installed in advance on the ROM 1002 or the storage 1008.

Note that the program executed by the server apparatus 50 may be a program in which processes are chronologically performed in the order of the description in the present disclosure, or may be a program in which processes are performed in parallel or a process is performed at a necessary timing such as a timing of calling.

All of the hardware configuration of the server apparatus 50 does not have to be included in a single apparatus, and the server apparatus 50 may include a plurality of apparatuses. Further, a portion of or all of the hardware configuration of the server apparatus 50 may be included in a plurality of apparatuses connected to each other via a network.

Note that the present technology may also take the following configurations.

(1) An information processing apparatus, including:
- a control section that
  - performs rendering to generate a first video obtained when a virtual space to which a plurality of users is capable of getting connected is viewed from a first point of view,
  - assigns, to the first video, an identifier indicating that a first slice that is given a high communication priority is used for communication, performs rendering to generate a second video obtained when the virtual space is viewed from a second point of view that is different from the first point of view, and assigns, to the second video, an identifier indicating that a second slice that is given a lower communication priority than the first slice is used for communication; and a communication section that transmits the first video and the second video through a communication network.

(2) The information processing apparatus according to (1), in which the virtual space is a virtual space generated by a game, the first point of view is a point of view of a player of the game, and the second point of view is a point of view of a viewer of the game.

(3) The information processing apparatus according to (2), in which the second point of view is a point of view of a switcher who generates a watching-use video of the game.

(4) The information processing apparatus according to (2), in which the second point of view is a specific point of view selected by the number of audiences from a plurality of closely situated points of view classified into clusters, each of the plurality of closely situated points of view being a point of view of an audience who is capable of viewing the virtual space from an arbitrary point of view.

(5) The information processing apparatus according to any one of (1) to (4), in which the control section further performs rendering to generate a third video obtained when the virtual space is viewed from a third point of view that is different from the first point of view and the second point of view, and assigns, to the third video, an identifier indicating that a third slice that is given a lower communication priority than the second slice is used for communication, and the communication section further transmits the third video through the communication network.

(6) The information processing apparatus according to (5), in which the virtual space is a virtual space generated by a game, the first point of view is a point of view of a player of the game, the second point of view is a point of view of a switcher who generates an audience-use video of the game, and the third point of view is a specific point of view selected by the number of audiences from a plurality of closely situated points of view classified into clusters, each of the plurality of closely situated points of view being a point of view of an audience who is capable of viewing the virtual space from an arbitrary point of view.

(7) The information processing apparatus according to (1), in which the virtual space is a virtual space generated by combining videos of a sports competition that are captured using a plurality of cameras, the first point of view is a point of view of a switcher who generates an audience-use video of the game, and the second point of view is a specific point of view selected by the number of audiences from a plurality of closely situated points of view classified into clusters, each of the plurality of closely situated points of view being a point of view of an audience who is capable of viewing the virtual space from an arbitrary point of view.

(8) An information processing system, including:

a first terminal that includes a first control section and a first communication section;

a second terminal that includes a second control section and a second communication section; and a server apparatus that includes a third control section that performs rendering to generate a first video obtained when a virtual space to which a plurality of users is capable of getting connected is viewed from a first point of view, assigns, to the first video, an identifier indicating that a first slice that is given a high communication priority is used for communication, performs rendering to generate a second video obtained when the virtual space is viewed from a second point of view that is different from the first point of view, and assigns, to the second video, an identifier indicating that a second slice that is given a lower communication priority than the first slice is used for communication, and a third communication section that is connected to the first communication section and the second communication section through a communication network, the third communication section transmitting the first video to the first communication section and transmitting the second video to the second communication section.

REFERENCE SIGNS LIST

10 terminal
11 control section
12 communication section
20 base station
21 control section
22 communication section
30 core network
40 network
50 server apparatus
51 control section
52 communication section
100 information processing system

The invention claimed is:

1. An information processing apparatus, comprising:

a control section configured to:

generate a virtual space based on data of a game;

generate a first video based on the virtual space that is viewed from a first point of view, wherein a plurality of users is connected to the virtual space via a plurality of terminals;

assign a first identifier to the first video, wherein the first identifier indicates that a first slice is associated with communication of the first video, the first slice corresponds to a first communication network, and the first communication network is a logical network for enhanced Mobile Broadband (eMBB);

generate a second video based on the virtual space that is viewed from a second point of view that is different from the first point of view; and assign a second identifier to the second video, wherein each of the first identifier and the second identifier is Single-Network Slice Selection Assistance Information (S-NSSAI), the second identifier indicates that a second slice is associated with communication of the second video, the second slice corresponds to a second communication network different from the first communication network, the second communication network is a logical network for Ultra-Reliable and Low Latency Communications (URLLC), a communication priority of the second slice is lower than a communication priority of the first slice, the first slice and the second slice are virtual networks in a physical network, the physical network includes the first communication network and the second communication network, and the first slice is independent from the second slice; and a communication section configured to:

transmit, to a first terminal of the plurality of terminals, the first video through the first communication network; and transmit, to a second terminal of the plurality of terminals, the second video through the second communication network.

2. The information processing apparatus according to claim 1, wherein the first point of view is a point of view of a player of the game, and the second point of view is a point of view of a viewer of the game.

3. The information processing apparatus according to claim 2, wherein the second point of view is a point of view of a switcher, and the switcher generates a watching-use video of the game.

4. The information processing apparatus according to claim 2, wherein the second point of view is selected, by a plurality of audiences, from a plurality of closely situated points of view, the plurality of closely situated points of view is classified into clusters, the plurality of closely situated points of view is in a specific range in the virtual space, each of the plurality of closely situated points of view is associated with a respective audience of the plurality of audiences, and the respective audience views the virtual space from an arbitrary point of view of the plurality of closely situated points of view.

5. The information processing apparatus according to claim 1, wherein the control section is further configured to:

generate a third video based on the virtual space that is viewed from a third point of view that is different from the first point of view and the second point of view; and assign a third identifier to the third video, wherein the third identifier indicates that a third slice is associated with communication of the third video, the third slice corresponds to a third communication network, the physical network includes the third communication network, and a communication priority of the third slice is lower than the communication priority of the second slice; and the communication section is further configured to transmit, to a third terminal of the plurality of terminals, the third video through the third communication network.

6. The information processing apparatus according to claim 5, wherein the first point of view is a point of view of a player of the game, the second point of view is a point of view of a switcher, the switcher generates an audience-use video of the game, the third point of view is selected, by a plurality of audiences, from a plurality of closely situated points of view, the plurality of closely situated points of view is classified into clusters, the plurality of closely situated points of view is in a specific range in the virtual space, each of the plurality of closely situated points of view is associated with a respective audience of the plurality of audiences, and the respective audience views the virtual space from an arbitrary point of view of the plurality of closely situated points of view.

7. The information processing apparatus according to claim 1, wherein the control section is further configured to generate the virtual space based on a combination of a plurality of videos of a sports competition, the game is associated with the sports competition, a plurality of cameras captures the plurality of videos, the first point of view is associated with a switcher, the switcher generates an audience-use video of the sports competition, the second point of view is selected, by a plurality of audiences, from a plurality of closely situated points of view, the plurality of closely situated points of view is classified into clusters, the plurality of closely situated points of view is in a specific range in the virtual space, each of the plurality of closely situated points of view is associated with a respective audience of the plurality of audiences, and the respective audience views the virtual space from an arbitrary point of view of the plurality of closely situated points of view.

8. An information processing system, comprising:

a first terminal that includes:

a first control section; and a first communication section;

a second terminal that includes:

a second control section; and a second communication section; and a server apparatus that includes:

a third control section configured to:

generate a virtual space based on data of a game;

generate a first video based on the virtual space that is viewed from a first point of view, wherein a plurality of users is connected to the virtual space via a plurality of terminals;

assign a first identifier to the first video, wherein the first identifier indicates that a first slice is associated with communication of the first video, the first slice corresponds to a first communication network, and the first communication network is a logical network for enhanced Mobile Broadband (eMBB);

generate a second video based on the virtual space that is viewed from a second point of view that is different from the first point of view; and assign a second identifier to the second video, wherein each of the first identifier and the second identifier is Single-Network Slice Selection Assistance Information (S-NSSAI), the second identifier indicates that a second slice is associated with communication of the second video, the second slice corresponds to a second communication network different from the first communication network, the second communication network is a logical network for Ultra-Reliable and Low Latency Communications (URLLC), a communication priority of the second slice is lower than a communication priority of the first slice, the first slice and the second slice are virtual networks in a physical network, the physical network includes the first communication network and the second communication network, and the first slice is independent from the second slice; and a third communication section that is connected to the first communication section and the second communication section through the physical network, wherein the third communication section is configured to:

transmit the first video to the first communication section through the first communication network; and transmit the second video to the second communication section through the second communication network.

* * * * *